United States Patent [19]

Inagaki et al.

[11] 4,315,130

[45] Feb. 9, 1982

[54] METHOD OF TREATING OBJECT BY LASER BEAM AND APPARATUS THEREFOR

[75] Inventors: Masahisa Inagaki, Hitachi; Ryutarou Jinbou, Hitachiota; Tomio Unino; Tomohiko Shida, both of Hitachi, all of Japan

[73] Assignee: Hitachi, Ltd., Tokyo, Japan

[21] Appl. No.: 16,167

[22] Filed: Feb. 28, 1979

[30] Foreign Application Priority Data

Mar. 3, 1978 [JP] Japan .................................. 53/23525

[51] Int. Cl.³ .............................................. B23K 27/00
[52] U.S. Cl. .......................... 219/121 L; 219/121 LA; 219/121 LP; 219/121 LQ; 219/121 LT; 219/121 LU; 219/121 LM
[58] Field of Search .... 219/121 L, 121 LM, 121 LA, 219/121 LP, 121 LQ, 121 LR, 121 LS, 121 LT, 121 LU, 121 LV, 121 LW; 346/76 L

[56] References Cited

U.S. PATENT DOCUMENTS

| | | | |
|---|---|---|---|
| 3,230,475 | 1/1966 | Koester et al. | 219/121 L X |
| 3,524,046 | 8/1970 | Brouwer | 219/121 L |
| 3,588,439 | 6/1971 | Heller et al. | 219/121 L |
| 3,622,740 | 11/1971 | Ravussin et al. | 219/121 L |
| 3,689,159 | 9/1972 | Taniguchi et al. | 219/121 L X |
| 3,775,586 | 11/1973 | Flint et al. | 219/121 L |
| 3,848,104 | 11/1974 | Locke | 219/121 LA |
| 3,860,784 | 1/1975 | Brown et al. | 219/121 LM |
| 3,941,973 | 3/1976 | Luck, Jr. et al. | 219/121 L |
| 3,965,327 | 6/1976 | Ehlscheid et al. | 219/121 LM |
| 4,083,629 | 4/1978 | Kocher et al. | 219/121 L X |
| 4,088,865 | 5/1978 | Peters et al. | 219/121 L |
| 4,099,830 | 7/1978 | Whittle et al. | 219/121 L X |
| 4,167,662 | 9/1979 | Steen | 219/121 LM |

OTHER PUBLICATIONS

Seebe, N. B., "Light Scanners", *IBM Tech. Disc. Bull.*, vol. 16, No. 6, Nov. 1973, pp. 1964-1966.

Lean, E. G. et al., "Device for Making High Resolution Interdigital Transducers", *IBM Tech. Disc. Bull.*, vol. 13, No. 12, May 1971, pp. 3687-3690.

*Primary Examiner*—C. L. Albritton
*Attorney, Agent, or Firm*—Craig and Antonelli

[57] ABSTRACT

There are disclosed a laser treatment method and an apparatus therefor in which a laser beam is irradiated on an object to be treated. The laser beam emitted from a laser apparatus is divided into a plurality of fractional beams, and the fractional laser beams are reflected toward and irradiated on an area to be irradiated of the object being treated after being compounded such that energy density distribution on the irradiated area is made substantially uniform in at least one direction.

9 Claims, 16 Drawing Figures

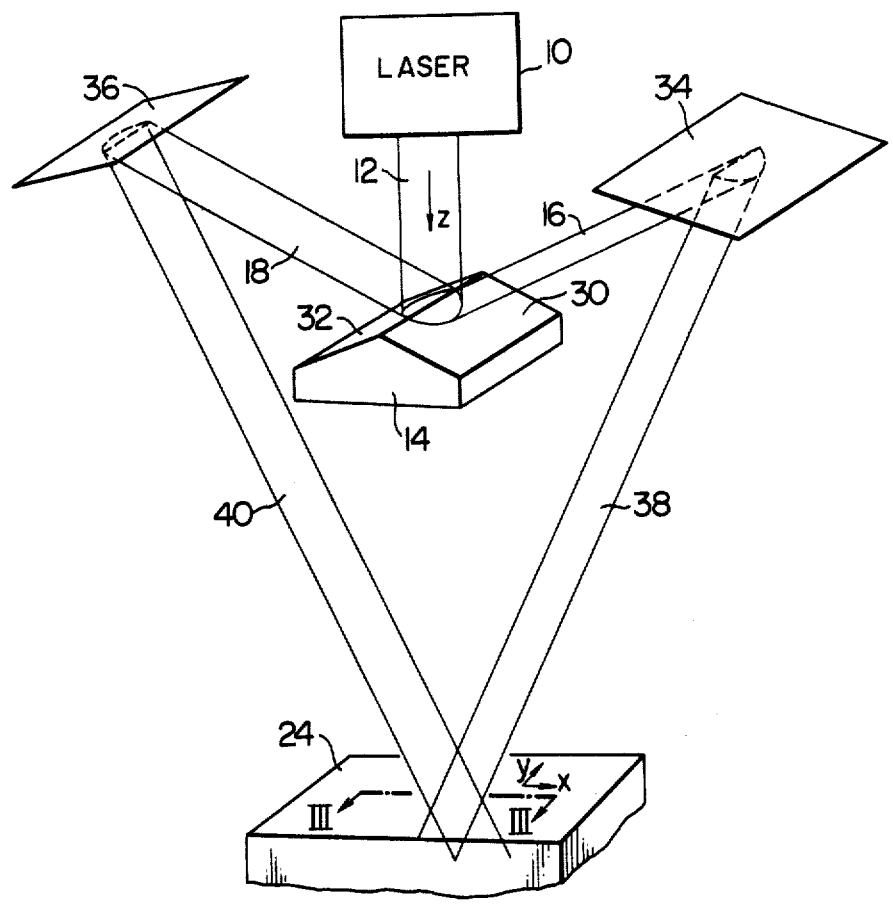
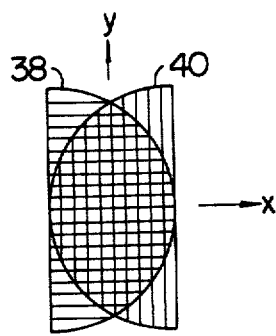

METHOD OF TREATING OBJECT BY LASER BEAM AND APPARATUS THEREFOR

The present invention relates to a method of treating an object by a laser beam and an apparatus therefor in which the object to be treated is irradiated by the laser beam, and more particularly to a method and apparatus which is capable of providing a laser beam of uniform energy density distribution suitable for thermal treatment of the object and making the entire irradiation energy substantially uniform for every individual unit area on the irradiated surface of the object to be treated.

The energy density of a laser beam derived from a laser apparatus usually has a distribution subject to various modes depending on characteristics of the laser apparatus. Namely the intensity distribution of the laser beam on a cross-sectional plane perpendicular to the beam transmission direction shows a specific pattern, that is a mode pattern, depending on the characteristics of the laser apparatus.

Where the laser beam thus produced is irradiated on an object to be treated to carry out a surface thermal treatment, such as surface quenching, surface alloying and the like, uniformity in the energy density distribution on the beam cross-section is first required. Taking a laser beam in the TEMoo mode subject to a Gaussian distribution, for example, the energy density is high at the center of the circular beam cross-section and decreases exponentially as it deviates from the center. Namely, the energy is most concentrated in the vicinity of the optical axis. When the laser beam with this distribution is focused through a focusing lens and is then irradiated on the surface of the object to be treated, the laser energy is concentrated to a central portion of the irradiated area. Consequently, the temperature in the central portion is raised so excessively that the material at the central portion is vaporized, leaving behind a recess and/or cracks. This prevents ideal surface quenching and surface alloying.

Next to the aforementioned requirement, in the surface thermal treatment of interest, it is necessary to make uniform the entire amount of energy irradiated on every individual unit area on the irradiated surface of the object to be treated. Suppose now that a laser beam having a uniform energy density distribution over its circular cross-section area can be obtained by any suitable means and this laser beam is scanned in one direction in order to thermally treat, for example, to quench, a relatively large area on the surface of an object to be treated. In such a case, since the cross-section of the laser beam irradiated on the object is circular, the portion of the irradiated surface through which the central portion of the beam passes receives more energy than the portion of the irradiated surface through which the peripheral portion of the beam passes, thereby making it difficult to heat uniformly every portion of the surface to be treated.

Various methods have hitherto been proposed to provide a laser beam of a uniform energy density distribution. They are classified into two major types of which one intends to adjust the density distribution by means of an optical system and the other intends to so modify the construction of laser apparatus per se as to solve the problem in question.

As a method of adjusting the laser beam energy density distribution by means of an optical system, a filter method, will first be discussed which is disclosed in Japanese Patent Publication No. 26,075/'71 published July 28, 1971, for example. According to the method disclosed therein, a filter having less light transmittivity at its central portion than at the other portion is disposed on a light path of a Gaussian type laser beam to thereby more uniformly distribute the energy density of the laser beam which has passed through the filter. Next, reference is made to an optical scattering method as announced in Data Sheet No. 511 entitled "Optical Integraters" issued March, 1975 by SPAWR Optical Research, Inc. of the United States of America and as disclosed in Japanese Patent Publication No. 5,665/'69 published Mar. 10, 1969. The former employs a downward-tapered rectangular reflector forming a square cross-sectional hollow whose inner surface serves as a reflecting surface. A laser beam is focused by a spherical, concave reflecting surface through an upper opening of the hollow reflector to the inner reflecting surface to be reflected thereat several times so that the laser beam is scattered to uniformly distribute the energy density, and the scattered laser beam is again focused by a second spherical, concave reflecting surface to be irradiated on an object. On the other hand, the latter attains a uniform energy density distribution by rotating a laser beam having a nonuniform energy density distribution, around the optical axis.

As a method of modifying the construction of the laser apparatus per se to attain uniformity of the energy density distribution of the emitted laser beam, a proposal by GTE Silvania Inc. of the United States of America is mentioned. In a catalog issued Feb. 1, 1977 by GTE Silvania Inc. there is disclosed a $CO_2$ laser, Model 975 having a rated high output power of 5 KW, which emits a circular beam having a great number of peaks of energy density distribution which are substantially uniform as a whole.

The aforementioned filter method of Japanese Patent Publication No. 26,075/'71 has a disadvantage in that a great deal of laser energy is lost. The proposal by SPAWR Optical Research Inc. is successful in obtaining a laser beam of square cross-section having a uniform energy density distribution but is disadvantageous in that the beam cross-section is excessively widened and also the beam is prevented from being focused in one direction for the sake of providing a narrow-width, stripe beam, resulting in poor efficiency of surface thermal treatment. In the method of Japanese Patent Publication No. 5,665/'69, a laser beam to be irradiated on the surface of the object being treated is of a circular cross-section but such a laser beam itself, as described above, cannot afford make uniform the entire amount of irradiation energies on individual unit areas on the irradiated surface. In addition, this method has difficulties with focussing the beam in one direction to provide a narrow width beam. The proposal by GTE Silvania Inc. inevitably requires a laser apparatus of a large output capacity and also encounters the same problem as mentioned above arising from the circular cross-section of the beam.

The present invention intends to obviate the aforementioned prior art disadvantages and has as its object to provide a method of treating an object by a laser beam and an apparatus therefor, which can easily provide a laser beam of substantially uniform energy density distribution with which it is possible to unify the entire amount of irradiation energy on individual unit areas on the irradiated surface of an object to be treated.

According to one aspect of the present invention, there is provided a method of treating an object by a laser beam in which the object to be treated is irradiated by the laser beam comprising the steps of emitting the laser beam from a laser apparatus, dividing the laser beam into a plurality of fractional laser beams, and irradiating the plurality of fractional beams on an area to be irradiated of the object to be treated after compounding the plurality of fractional beams such that energy density distribution on the irradiated area is made substantially uniform in at least one direction.

According to another aspect of the present invention, there is provided an apparatus for laser beam treatment comprising means for generating a laser beam, means for dividing the laser beam into a plurality of fractional laser beams, and means for irradiating the plurality of fractional beams on an area to be irradiated of an object to be treated after compounding the fractional beams such that energy density distribution on the irradiated area is made substantially uniform in at least one direction.

The present invention will be described in more detail by way of preferred embodiments by referring to the accompanying drawings in which:

FIG. 2 is a schematic, diagrammatic representation useful to explain the principle of an embodiment of a method for a laser treatment according to the present invention;

FIG. 3 is a plan view to show a cross-sectional configuration of a laser beam on an object to be treated according to the embodiment of FIG. 2;

Figure 1:
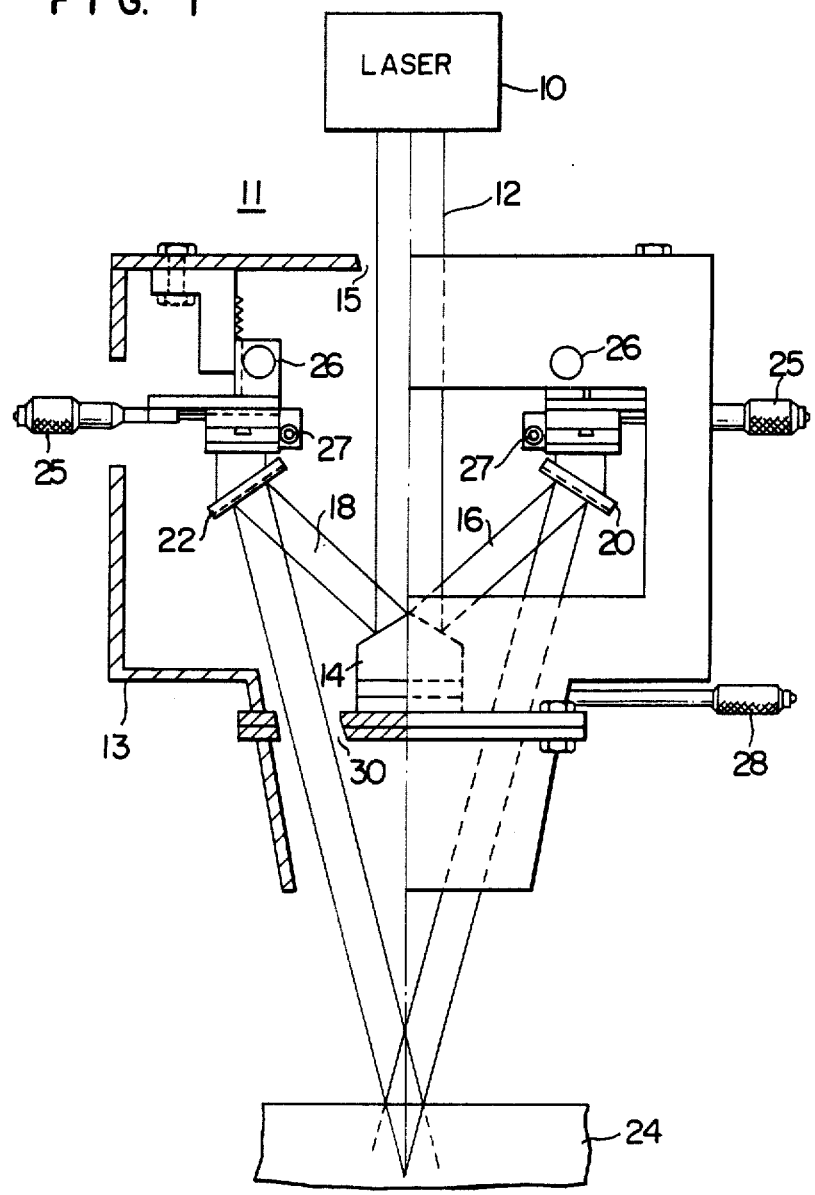
FIG. 1 is a partially cross-sectional elevation view to show an overall construction of an apparatus for laser treatment embodying the present invention.

Referring to FIG. 1 generally showing an overall construction of an apparatus for laser treatment according to the present invention, the apparatus comprises a laser apparatus 10 for generating a laser beam 12, and a head generally designated at 11 and having a protective cover or housing 13. The laser beam 12 is led to the interior of the head through a laser beam inlet opening 15 of the head. The laser beam 12 is reflected to two reflecting surfaces of a mirror 14 to be divided into two fractional beams 16 and 18. The two fractional beams 16 and 18 are respectively led to reflecting mirrors 20 and 22, preferably in the form of a concave surface of second degree, and reflected there toward a laser beam outlet opening 30 of the housing 13 so as to be compounded on an area of an object 24 being treated. Dividing mirror and reflecting mirror position adjusters 25, 26, 27, and 28 are adapted to adjust the projection of the fractional beams reflected from the reflecting mirrors 20 and 22 such that the fractional beams are compound on a desired location of the object 24 being treated. To this end, the adjusters 26, 25 and 27 are respectively designed for adjusting the respective reflecting mirrors 20 and 22 to displace them in the direction in which the laser beam 12 travels (hereinafter referred to as z-direction), to displace them in the direction of the ridge line between the two reflecting surfaces of the dividing mirror 14 in a plane perpendicular to the z-direction (hereinafter referred to as y-direction), and to displace them in the direction perpendicular to the y-direction in the plane perpendicular to the z-direction (hereinafter referred to as x-direction). The adjuster 28 serves to displace the dividing mirror 14 in the y-direction.

A preferred embodiment of the present invention is based on a principle as detailed below.

Referring to FIG. 2, in a first embodiment of the present invention, a laser beam 12 emitted from a laser apparatus 10 and having a Gaussian energy density distribution is irradiated on a gable-roof-like dividing mirror 14 having two plain reflecting surfaces 30 and 32 such that the diametral center line of the laser beam cross-section coincides with the ridge line of the mirror 14 in order to ensure that the laser beam 12 is divided into two similar fractional laser beams 16 and 18. The two fractional laser beams 16 and 18 are reflected at two reflecting mirrors 34 and 36 to travel on such paths as beams 38 and 40 do. To ensure that the reflected fractional beams 38 and 40 are compounded with respective cross-sectional configurations of fractional laser beams 38 and 40 positioned in a relation as shown in FIG. 3 on an irradiated area of the object 24 being treated, the positions of the dividing mirror 14 and reflecting mirrors 34 and 36 are adjusted by the adjusters 25, 26, 27 and 28 as shown in FIG. 1 (not shown in FIG. 2). As a result of this compounding of the fractional laser beams, the energy density distribution of the laser beam on the irradiated area of the object 24 being treated is made substantially uniform in the above-mentioned x-direction, as will be seen from FIG. 3.

In this embodiment, since the fractional laser beams 38 and 40 are irradiated in such a manner that these fractional beams intersect and overlap with each other on the area to be irradiated of the object 24, the original Gaussian energy density distribution of the laser beam taken out from the laser apparatus is shaped into the substantially uniform energy density distribution and hence the applied laser beam can be more uniform than that of the conventional methods.

Additionally, the simplicity of the mirror system including the mirror 14 having the two plain reflecting surfaces 30 and 32 and the plain reflecting mirrors 34 and 36 for compounding the fractional beams leads to an inexpensive construction.

Figure 4:
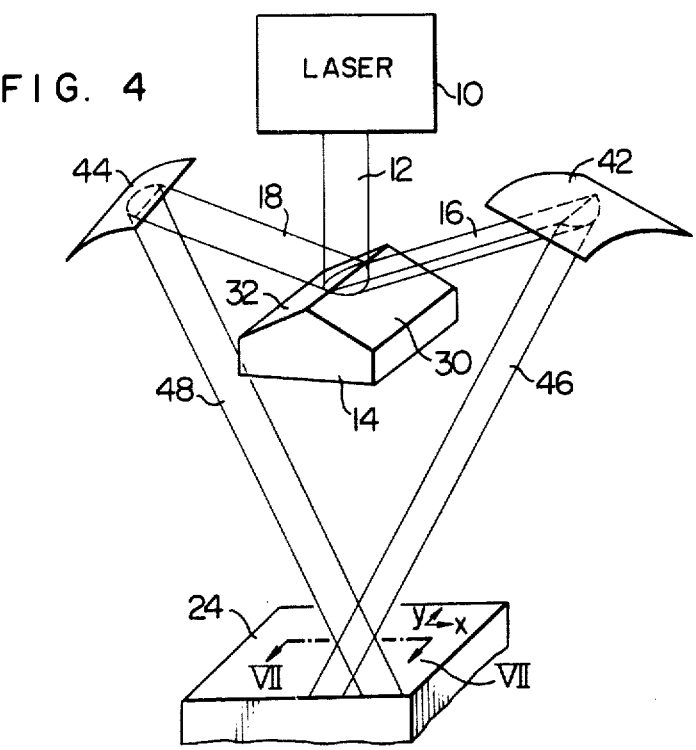
FIG. 4 is a schematic, diagrammatic representation useful to explain the principle of another embodiment of the laser treatment method according to the present invention.
Figure 5:
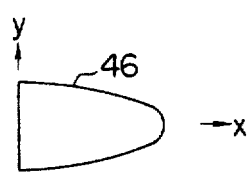
FIGS. 5 and 6 are plan views to respectively show a cross-sectional configuration of the respective fractional laser beams according to the embodiment of FIG. 4.
Figure 6:
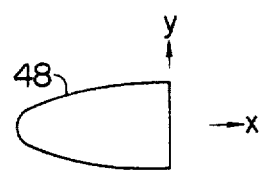

A second embodiment of the present invention as shown in FIG. 4 comprises a pair of reflecting mirrors 42 and 44 for compounding fractional beams, each having a cylindrical concave reflecting surface of second degree different from the plain reflecting surfaces of the first embodiment. Except for the above, this embodiment is quite similar to the first embodiment.

Figure 7:
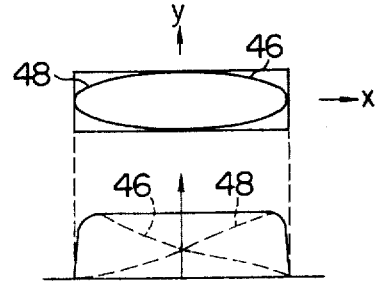
FIG. 7 is a diagram to show a cross-sectional configuration and an energy density distribution of laser beam irradiated on an object to be treated according to the embodiment of FIG. 4.

In the second embodiment, fractional laser beams 46 and 48 reflected at the concave surfaces 42 and 44 take the form of a semi-elliptical configuration which results from compression in the chord direction of a semicircle, and overlap with each other on an object 24 being treated, having a substantially rectangular cross-sectional configuration as shown in FIG. 7. The applied laser beam has a substantially uniform energy density distribution in the x-direction and is sufficiently narrow in the y-direction, offering a high energy density distribution.

Because of the fractional laser beams focused or converged by the concave reflectors, the applied laser beam can have a high energy with a laser apparatus of a relatively low output.

Figure 8:
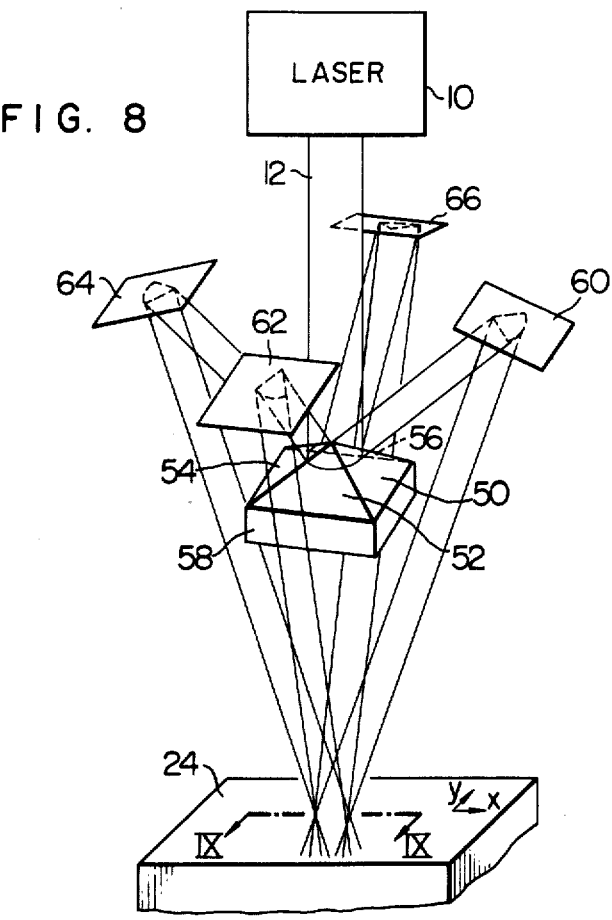
FIG. 8 is a schematic, diagrammatic representation to show a construction of a further embodiment of the laser treatment method according to the present invention.

A third embodiment of the present invention as shown in FIG. 8 comprises a regular pyramid-like mirror 58 for dividing the original laser beam 12 and having four plain reflecting surfaces 50, 52, 54 and 56, and four plain mirrors 60, 62, 64 and 66 arranged correspondingly. Except for the above, this embodiment is quite similar to the first embodiment.

Figure 9:
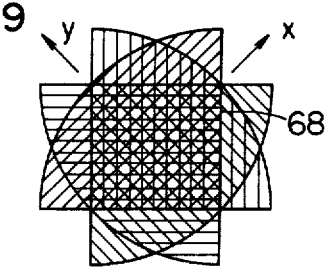
FIG. 9 is a diagram to show a cross-sectional configuration of a laser beam irradiated on an object to be treated according to the embodiment of FIG. 8.

In this embodiment, a laser beam 12 is centered with the apex of the regular pyramid-like mirror 58, and a high energy is concentrated to corners of a square region 68 (FIG. 9). Accordingly, the fractional laser beams intersect with each other and are compounded on an area to be irradiated of the object 24 being treated to form an applied laser beam having a cross-sectional configuration as shown in FIG. 9. The applied laser beam has substantially uniform energy density distributions in both the x-direction and y-direction within the square region 68.

In place of the plain reflecting mirrors for compounding the fractional laser beams, this embodiment may be modified to include reflecting mirrors each having a concave reflecting surface of second degree to raise the energy density for laser beam treatment.

Figure 10:
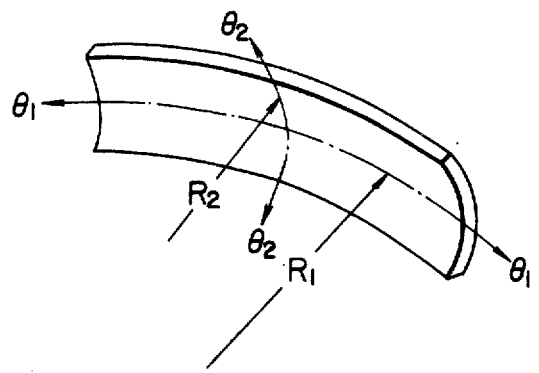
FIG. 10 is a perspective view to show a modified embodiment of a reflecting mirror for dividing a laser beam and compounding the fractional laser beams.

In the foregoing embodiments, the reflecting mirrors for compounding the fractional beams were described and illustrated as each having a plain surface or a concave reflecting surfaces of second degree. Alternatively, a reflecting mirror as shown in FIG. 10 having a curved reflecting surface with curvatures in $\theta_1$ and $\theta_2$ directions which are denoted by radii of curvature $R_1$ and $R_2$, respectively, may be used for attaining similar effects.

Figure 11:
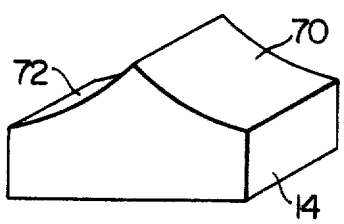
FIGS. 11 to 14 are perspective views to show various modified embodiments of reflecting mirror for dividing a laser beam.

The mirror 14 for dividing the original laser beam into two fractional beams having plain reflecting surfaces as explained with reference to the foregoing embodiments may be so modified as to have concave reflecting surfaces 70 and 72 of second degree as shown in FIG. 11, thereby providing the ability to focus or converge the respective fractional laser beams.

Figure 12:
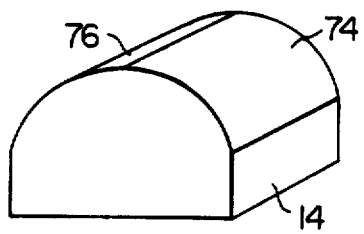

Obviously, a dividing mirror having convex reflecting surfaces 74 and 76 may be used, as shown in FIG. 12, in which the fractional laser beams are once diverged by the convex reflecting surfaces and then reflected and compounded by means of concave reflecting mirrors.

Figure 13:
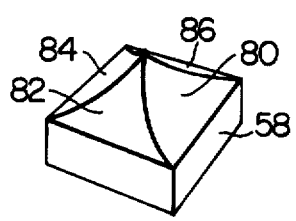
Figure 14:
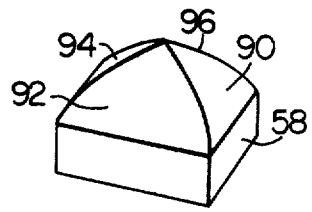

Also, the mirror 58 for dividing the original laser beam into four fractional beams having plain reflecting surfaces as explained with reference to the foregoing embodiment may be so modified as to have concave reflecting surfaces 80, 82, 84 and 86 as shown in FIG. 13 or convex reflecting surfaces 90, 92, 94 and 96 as shown in FIG. 14.

Figure 15:
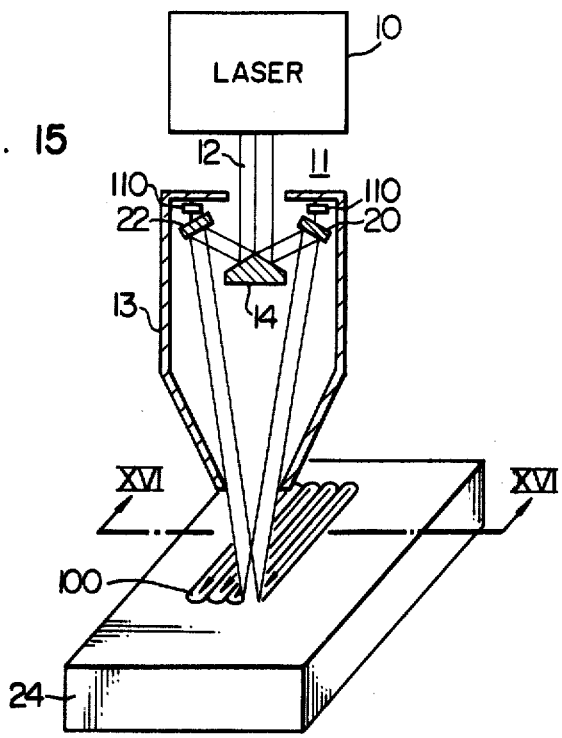
FIG. 15 is a perspective view to show an apparatus for laser treatment embodying the present invention which was used to treat an object as an experiment.
Figure 16:
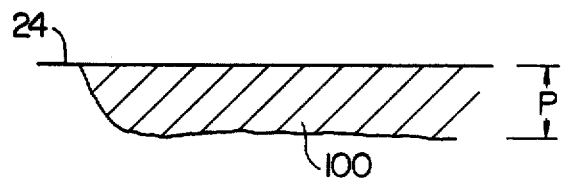
FIG. 16 is a diagram to show a quenched region in the object treated according to the apparatus of FIG. 15.

Experimentally, the surface of a carbon steel containing 0.44% carbon was scanned with a laser beam as shown in FIG. 15 to quench the carbon steel surface by using, as an example, a continuous 2 kW $CO_2$ gas laser beam of 30 mm in diameter with a Gaussian energy density distribution, as a heat source. The laser beam was scanned at a speed of 3 m/min. After quenching, the carbon steel standing for a object 24 to be treated was cut on XVI—XVI line to expose a hardened region 100 as shown in FIG. 16, which region was of a hardness above Hv 550 with a depth of 0.4 mm. Thermal treatment efficiency (area of hardened surface/time) was approximately doubled as compared with a process utilizing the usual laser beam having a Gaussian energy density distribution to harden a region of 0.4 mm depth, and irregularity in hardened depth was minimized. In FIG. 15, the reference numeral 110 is used to designate in general the compounding reflecting mirror position adjusters 25, 26 and 27 shown in FIG. 1.

This embodiment can afford to provide an apparatus for laser treatment easily providing an energy density distribution suitable for thermal treatments by merely attaching a head 11 including dividing and compounding mirrors and integrated by a protective cover or housing 13 to a conventional laser treatment apparatus specialized for welding.

As described above, according to the present invention, in a laser treatment method in which a laser beam is irradiated on an object to be treated, the laser beam is divided into a plurality of fractional laser beams, and the respective fractional beams are reflected toward and simultaneously irradiated on an area to be irradiated of the object being treated after being compounded such that the energy density distribution on the irradiated area is made uniform in at least one direction. Accordingly, the laser beam utilized for treating the object has a uniform energy density distribution, and when applied to thermal treatments it can efficiently form thermally treated layers of a uniform and stabilize the quality of the treated region.

Since an apparatus for laser treatment according to the present invention comprises a dividing mirror for dividing a laser beam into a plurality of fractional beams and compounding reflectors for reflecting the respective fractional laser beams to simultaneously irradiate them on an area to be irradiated of an object being treated after compounding the fractional laser beams such that the energy density distribution on the irradiated area is made uniform in at least one direction, the apparatus can attain an additional advantage of being more durable than a focusing system using a lens made of potassium chloride even when used with a large power laser beam.

What we claim is:

1. A method of treating an object by a laser beam in which the object to be treated is irradiated by the laser beam, comprising the steps of:

emitting a laser beam having a non-uniform symmetrical pattern of energy distribution from a laser apparatus;

dividing said laser beam along at least one line of symmetry into a plurality of fractional laser beams each having a cross-sectional area which is equal to the cross-sectional area of the other fractional laser beams; and directing said plurality of fractional laser beams into overlapping relationship directly onto the surface of the object to be treated, in a manner so that the pattern of said overlapping beams on said surface has a substantially-rectangular form and the energy density distribution of said pattern is made substantially uniform along at least one dimension of said rectangular pattern.

2. An apparatus for treating an object by a laser beam comprising:

means for generating a laser beam having a non-uniform symmetrical pattern of energy distribution;

means for dividing the laser beam into a plurality of fractional laser beams each having a cross-sectional area representing a segment of the original beam which is equal in area to the cross-sectional area of the other segments; and means for directly reflecting said plurality of fractional beams into overlapping relationship on the same area on the surface of the object to be treated, in a manner so that the pattern of said overlapping beams on said surface has a substantially-rectangular form and the energy density distribution of said pattern is made substantially uniform along at least one dimension of said rectangular pattern.

3. A laser beam treatment apparatus according to claim 2, wherein said laser beam dividing means comprises means having at least two reflecting surfaces each disposed at a predetermined angle with respect to the laser beam incident thereto to reflect the incident portion of the laser beam toward said reflecting means as separate fractional beams.

4. A laser beam treatment apparatus according to claim 3, wherein each of said reflecting surfaces comprises a plain reflecting surface.

5. A laser beam treatment apparatus according to claim 3, wherein each of said reflecting surfaces comprises a curved reflecting surface.

6. A laser beam treatment apparatus according to claim 5, wherein said curved reflecting surface is of a curved surface of second degree.

7. A laser beam treatment apparatus according to claims 2, 3, 4, 5 or 6, wherein said reflecting means comprises the same number of plain surface reflecting mirrors as that of said fractional laser beams.

8. A laser beam treatment apparatus according to claims 2, 3, 4, 5 or 6, wherein said reflecting means comprises the same number of concave surface reflecting mirrors as that of said fractional laser beams.

9. An apparatus for treating an object by a laser beam in which the object to be treated is irradiated by the laser beam, comprising:

a laser for generating a laser beam having a non-uniform symmetrical pattern of energy distribution;

a housing having a laser beam inlet opening and a laser beam outlet opening;

a mirror having two plain reflecting surfaces and disposed within said housing with a ridge line between the two plain reflecting surfaces extending along a line of symmetry of the laser beam led to the housing through said inlet opening so as to divide said laser beam into two fractional laser beams and reflect them in predetermined directions, respectively;

two cylindrical concave surface mirrors each having a curved reflecting surface of second degree for reflecting each of said two reflected fractional laser beams and each being adjustably disposed within said housing;

two adjuster means disposed within said housing and operatively connected to said two concave surface mirrors, respectively, to adjust the locations of the associated cylindrical concave surface mirrors such that the respective fractional laser beams reflected from the respective concave surface mirrors are focused in overlapping relationship directly on a single area on the surface of the object to be treated by said focused fractional laser beams, in a manner so that the pattern of said overlapping beams on said surface has a substantially-rectangular form and the energy density distribution of said pattern is made substantially uniform in at least one dimension of said rectangular pattern.

* * * * *